Nov. 24, 1931.  J. W. DAVITT  1,833,775
APPARATUS FOR WEIGHING THE INGREDIENTS OF PAVING
MATERIALS PRIOR TO THE MIXING THEREOF
Filed Oct. 28, 1929   2 Sheets-Sheet 1
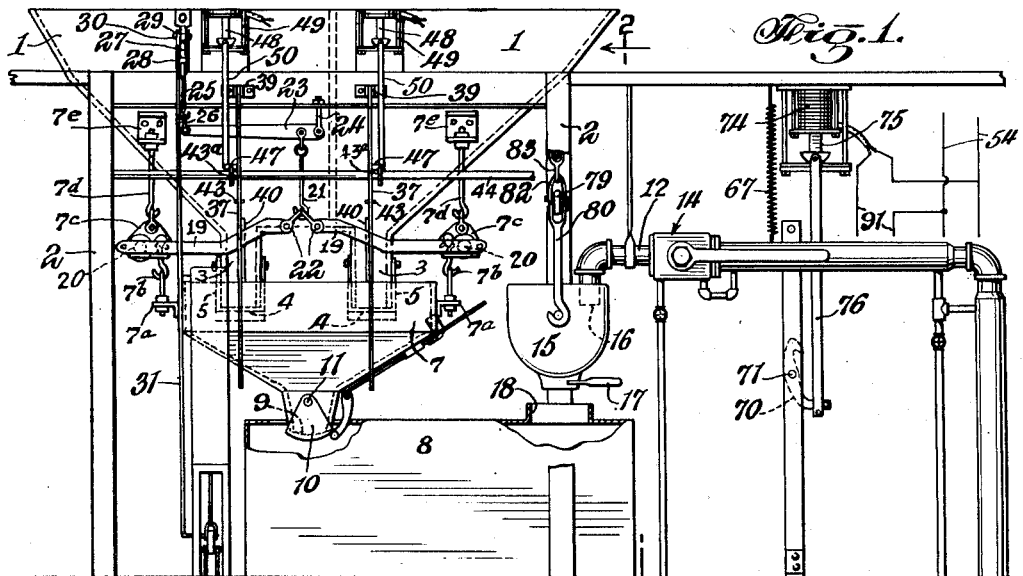
INVENTOR
John W. Davitt,
BY Baldwin & Wight
ATTORNEYS.

Nov. 24, 1931.  J. W. DAVITT  1,833,775
APPARATUS FOR WEIGHING THE INGREDIENTS OF PAVING
MATERIALS PRIOR TO THE MIXING THEREOF
Filed Oct. 28, 1929  2 Sheets-Sheet 2

INVENTOR
John W. Davitt,
BY Baldwin & Wight
ATTORNEYS.

Patented Nov. 24, 1931

1,833,775

UNITED STATES PATENT OFFICE

JOHN W. DAVITT, OF JERSEY CITY, NEW JERSEY

APPARATUS FOR WEIGHING THE INGREDIENTS OF PAVING MATERIALS PRIOR TO THE MIXING THEREOF

Application filed October 28, 1929. Serial No. 403,032.

My invention relates to apparatus for weighing the ingredients of mixtures prior to the mixing thereof and more particularly to apparatus of this class which is used for properly proportioning the ingredients of paving mixtures prior to their mixing.

In preparing paving materials it is important that the several ingredients such as Portland cement, the bituminous cements, sand, crushed rock, mineral filler and the like be very exactly proportioned in accordance with the specifications. In the past it has been the almost universal practice to prepare such mixures by filling the mixture container from a plurality of hoppers or ingredient containers, the filling from each ingredient container being individually controlled by suitable valves or the like which valves have always heretofore been under manual control. For this reason it has been impossible to obtain mixtures which are exactly in accordance with the specifications because of the fact that the human element enters in in such a way that the amount of each material which is supplied to the mixer may vary from time to time in accordance with efficiency of and the diligence of the operator.

The main object of my invention is to overcome the disadvantages resulting from this inaccurate mixing of ingredients through the provision of means for automatically controlling the introduction of each individual ingredient in such a way that when the apparatus comprising my invention is properly arranged to mix the ingredients in accordance with the specifications no skill or unusual care of the operator tending the machine is necessary in order to insure accurate compliance with the specifications.

In carrying out my invention I provide novel means for controlling the mixing of the several ingredients and it is to be understood that the invention further contemplates the use of such novel means in connection with the weighing of other materials than those which are ingredients of paving mixtures.

The invention will be more clearly understood from a reading of the following description, the appended claims and the several views illustrated in the drawings in which Figure 1 is a front elevation of an apparatus embodying my invention;

Figure 2 is a sectional view taken on the line 2—2 of Figure 1, certain parts being shown in elevation;

Figure 3:
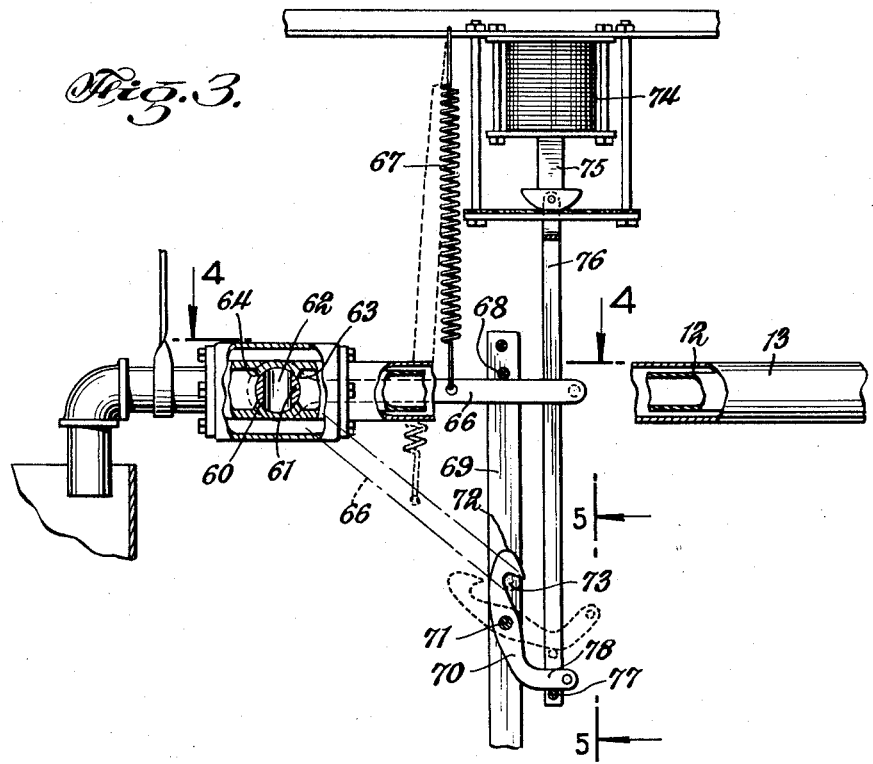
Figure 3 is a detailed view of a delivery pipe, a valve therein and automatic valve operating means.

In the drawings there is shown a plurality of hoppers 1 adapted for storage of solid materials and supported by means of columns 2. Each hopper is provided with a discharge spout 3 having a discharge opening 4 at the lower end thereof. For controlling the flow of material from each of the hoppers I provide a plurality of gates or closures 5 respectively disposed below the openings 4 and mounted for pivotal movements with respect to the spouts 3 by means of pins 6.

For receiving the material discharged from the respective hoppers I provide a receptacle 7 disposed below said openings. By means of the mechanism to be hereinafter described in detail the movement of the container 7, when filled with a certain predetermined quantity of material from either or both of the hoppers 1, functions to automatically close the closures 5. After the predetermined quantity of material has been delivered to the receptacle 7 so that the proper proportions of material from each hopper have been placed in the receptacle, these materials are then discharged from the container to a mixer 8 by means of a discharge opening 9 in the bottom of the receptacle which is controlled by means of a closure 10 mounted for pivotal movements as at 11 with respect to the receptacle.

For introducing the fluid bituminous material to the mixture and for automatically controlling the amount which is supplied to each batch of mixture I provide a supply pipe 12 inclosed in the usual manner within a jacket 13. This supply pipe and the jacket therefor is of old and well-known construction and do not, per se, form this invention.

For controlling the flow of the bituminous material through the pipe I provide a valve 14, and for receiving the discharge from this pipe previous to its being delivered to the mixer I provide a receptacle 15 supported under the discharge end 16 of the pipe 12. The receptacle 15 is provided with a discharge opening controlled by a manually operable valve 17. When this valve is open the material previously contained in the receptacle will be discharged into the mixer through the medium of an opening 18 in the top of the mixer which is disposed directly under the discharge opening of the receptacle. Means associated with the receptacle 15 are operable when a predetermined quantity of bituminous material has been delivered to the receptacle for automatically closing the valve 14 to prevent further flow of material into the receptacle.

With more particular reference to Figures 1 and 2, it will be seen that the receptacle 7 is provided at each of its ends with two spaced angle brackets 7a, respectively connected, by means of double link connections 7b, to the inner or free ends of four crank arms 7c which are fixed in pairs to two bars 20, 20, the latter being located at opposite sides of the receptacle. The bars 20 are in turn suspended from the hopper 1 through the medium of four hangers 7d having their upper ends respectively secured to brackets 7e on the hopper and having their lower ends pivotally connected to the arms 7c between the points of connection of the latter to their associated bars 20 and the free ends of the arms. To each bar 20 is secured one end of one of two arms 19, 19, the other ends of these arms being connected to a vertical link 21 by means of links 22, 22. The link 21 is in turn suspended from a lever 23 which has one of its ends pivoted to a bracket 24 secured to the hopper and which has its other end connected to a vertical link 25 through the medium of a hook 26. The link 25 is connected to and suspended from one end of a lever 27 by means of a hook 28, the lever 27 being suspended from a fixed bracket 29 by means of a hanger 30.

The other end of the lever 27 is connected by another hook 28 to a downwardly extending rod 31 which at its lower end is connected to one end of a sub-lever 32 of a scale generally designated 33, the lever 32 being fulcrumed at its center as at 33a. The other end of the lever 32 is connected to one end of a master scale beam 34 by means of a link 35, the beam 34 being carried by the scale casing and fulcrumed adjacent the link 35 as at 36. The master scale beam is provided with the usual graduated scale and sliding weight.

It will be observed that when the scale weight has been set at a point corresponding to the weight of material desired to be delivered into the receptacle 7 and such weight has been delivered, the receptacle will move downwardly and its motion will be transmitted to the scale beam through the medium of the intervening mechanism described above, the scale beam being in this manner raised.

In order to shut off the flow of material from the hopper into the receptacle I provide means for normally maintaining the closure 5 in its closed position, means for manually moving the closure to its open position, and means for releasably maintaining the closure in its open position, this latter means being automatically releasable to permit the closure to be closed. For manually opening the closure, I provide a hand lever 37 pivoted as at 38 to a bracket 39 secured to the hopper, and a link 40 having one of its ends pivoted to the hand lever as at 41, and having its other end pivotally connected to the closure as at 42. When the hand lever is rocked in a counter-clockwise direction as viewed in Fig. 2 the closure 5 will likewise be rocked and material will be discharged from the hopper through the associated opening 4. For normally maintaining the closure in its closed position, I provide a spring 43 interposed between the hand lever and the hopper and normally urging the hand lever toward the right.

Figure 6:
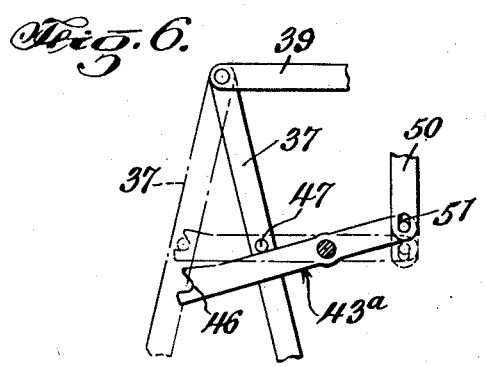
Figure 6 is a detail view of certain latch mechanism.
Figures 5, 7:
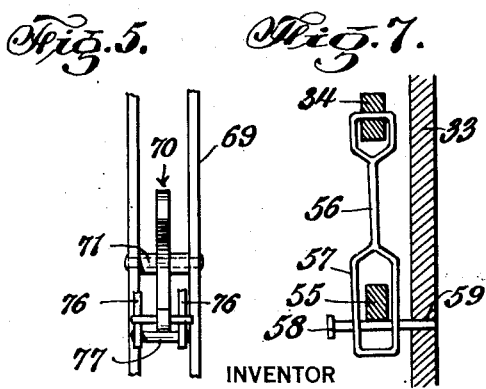
Figure 5 is a fragmentary detail view in elevation and looking in direction of the arrows 5—5 in Figure 3.
Figure 7 is a fragmentary sectional view taken on the line 7—7 of Figure 2.

For maintaining the closure in its open position when the hand lever has been swung to the left, I provide a latch 43a pivoted as at 44 to a bracket 45 on the hopper and having a nose 46 adapted to engage a pin 47 on the hand lever. The tail end of the latch 46 is connected to the plunger 48 of a solenoid 49 by means of a link 50 connected at its lower end to the tail end of the latch by means of a pin and slot connection 51 and at its upper end is pivoted to the plunger 48 which is normally in its lower or extended position relative to the solenoid. The weight of the plunger and the link 50 normally maintains the latch in the position shown in Fig. 2. As the lever 37 is swung to the left the pin 47 will cam the nose end of the latch downwardly until the pin has passed over the top edge of the latch at which time the latch will, under the influence of the weight of the plunger, return to its Fig. 2 position in which it will engage the pin 47 and maintain the hand lever 37 in a position shown in dotted lines in Fig. 6.

It is apparent that when the solenoid is energized and the plunger thus drawn upwardly the nose end of the latch will be swung downwardly thereby releasing the pin 47 from the nose and permitting the lever 37 to be returned to its Fig. 2 position under the influence of the spring 43. This movement of the lever also moves the closure to its closed position in the manner already described.

As stated above, it is desirable that the closure be automatically moved to its closed position as soon as a predetermined quantity of material has been delivered to the receptacle. To accomplish this purpose I provide means associated with the scale beam 34 and operable upon the raising thereof for closing an electrical circuit to energize the solenoid. As shown in Fig. 2 I provide the scale beam with a switch 52 which is connected in series with a solenoid 49 and a power line 54. Although various kinds of switches could be used and good results thus obtained I preferably employ what is known as the Mercoid switch since experience has shown that this type of switch is best adapted for this particular purpose. Although such switches are now generally known, for the purpose of clearness, it may be stated that essentially they consist of a glass tube, a pair of spaced contact points therein and a quantity of mercury which normally touches only one of the contacts, but which upon the tilting of the tube from its normal position touches both contacts thereby closing the circuit in which the switch is connected.

When the scale beam 34 has been raised in the manner already described during filling of the receptacle 7 the switch will be closed in the manner aforesaid, thus energizing the solenoid 49 and raising the plunger 48 which will release the pin 47 from the latch nose 46 and permit the spring 43 to return the closure to its closed position.

The foregoing description has had reference to one hopper, its associated closure and means for automatically controlling this closure. It is to be understood that in preparing mixtures of paving material it is common practice to first fill the receptacle, such as the receptacle 7 in the present case, with a quantity of one material, for instance, sand, and to subsequently add the required quantity of another material such as stone. In accordance with my invention means are provided for first introducing material from one hopper and for automatically shutting off this hopper when the required amount of material has been placed in the receptacle, for subsequently opening another hopper to introduce the required amount of another material and for subsequently and automatically closing this other hopper when the required amount of the second material has been introduced into the receptacle. For attaining this purpose I provide the scale 33 with a supplemental scale beam 55 fulcrumed as at 56 and adapted to be connected to the main scale beam 34 by means of a link 56 which is pivotally connected to the main beam 34 and which link at its lower end is provided with a stirrup 57 which passes around the supplemental beam 55. The supplemental scale beam is adapted to be maintained out of engagement with the stirrup 57 by means of a pin 58 which is adapted to be removably positioned in an opening 59 in the scale housing. When the pin 58 is withdrawn the supplemental beam will fall and will engage the bottom of the stirrup 57, the beam thus tending to pull the main scale beam 34 downwardly. This has the effect of placing an additional weight on the main scale beam without requiring the movement of the sliding weight or the placing on the beam of any exact scale weights.

In the drawings each hopper is shown as having a closure 5 associated therewith. These closures are identical and since the operation of one closure has already been described in detail it will not be necessary to describe the operation of the other. In like manner each closure is provided with a hand lever for opening the closure, a spring for normally maintaining the closure in closed position, and a latch for releasably maintaining the closure in open position, which are identical with the hand lever 37 the spring 43 and the latch 43a already described. Each latch is adapted to be operated by means of a solenoid and intermediate connecting link identical with the solenoid 49 and the link 50 described above. The several solenoids are connected in series so that when the scale beam 34 is raised and the switch 52 closed all of the solenoids will be energized. When the solenoids are thus energized the noses of all of the latches 43 will be swung downwardly so that those of the closures which were last opened will be automatically closed, whereas those which were in closed position will not be moved in any way, the associated latch partaking of an idle movement.

While it is believed that the above description of the apparatus for weighing the solid materials going into the mixture should make the operation thereof readily understood a brief description of the weighing of two different materials going into a batch of mixture is as follows:—Assuming the various parts to be in the positions shown in Figures 1 and 2, the weight on the main scale beam 34 will be adjusted to such a position that the beam will be raised when the desired quantity of material from the right hand hopper as viewed in Figure 1 has passed into the receptacle 7 and the weight on the supplemental scale beam 55 will be moved to a position in which this beam when connected to the main beam by withdrawal of the pin 58 will so additionally weight the main beam as will hold it down until the required amount of material has passed from the left hand hopper as viewed in Figure 1 to the receptacle. With the weights in these adjusted positions the hand lever 37 which is connected to the closure associated with the right hand hopper is swung to the left until the pin 47 is engaged by the nose of the associated latch and the closure will thereby be held in its open position. Material will then flow from the hopper until a sufficient quantity has fallen into the receptacle 7 to cause the latter to move downwardly and to raise the scale beam 34. As soon as the scale beam has been raised switch 52 will close the circuit and both solenoids 53 will be energized and the associated plungers will be drawn upwardly. This will disengage the latch nose 46 from the pin 47 and permit the spring 43 to return to the closure of the right hand hopper to its closed position. During this movement of the right hand closure the closure of the left hand hopper has remained in its closed position, not having been affected by the movement of the associated solenoid plunger. The pin 58 will then be withdrawn whereupon the supplemental beam 55 will fall and will lower the main beam 34 thus opening the switch and deenergizing the solenoids. The hand lever associated with the closure of the left hand hopper is then swung to the left until latched in the manner described. Material from the left hand hopper will then flow into the receptacle until the required weight which has been previously determined through the adjustment of the weight on the supplemental scale beam has entered the receptacle, at which time the receptacle will be lowered and the main scale and supplemental scale beams will be raised until the switch is closed and both solenoids are thereby energized. The left hand closure is thus released and returned to its closed position by means of the spring 43.

Figure 4:
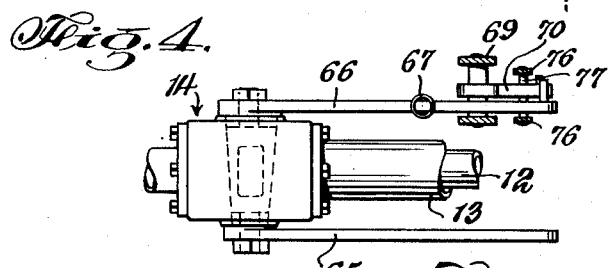
Figure 4 is a sectional view taken on the line 4—4 of Fig. 3.

With more particular reference to the valve 14 which controls the flow of bituminous or other semi-fluid material to the receptacle 7 it will be observed by reference to Figures 3 and 4 that this valve is of a well-known rotatable plug valve type. The valve illustrated comprises a casing 60 having a rotatable plug 61 mounted therein, the plug being formed with an opening 62 adapted to simultaneously register with an inlet port 63 and an outlet port 64. For opening the valve I provide a manually operable lever 65 connected to one end of the valve plug 61, and for normally maintaining the valve in close position, I provide a lever 66 secured to the other end of the valve plug and normally urged upwardly by means of a spring 67 connected to the arm 66 and to a fixed portion in connection with the hopper, the upward movement of the arm 66 being limited by a stop pin 68 secured to a fixed bracket 69. For maintaining the valve in its open position against the tension of the spring 67 I provide a latch 70 pivoted as at 71 to the bracket 69 and having a nose 72 adapted to engage a pin 73 on the end of the lever 66. For moving the latch 70 to release the pin 73 I provide a solenoid 74 having a plunger 75 which is adapted to be raised when the solenoid is energized and a forked link 76 which is connected at its upper end to the solenoid and which is provided at its lower end with a pin 77 upon which the tail end 78 of the latch 70 rests. When the parts are in the position shown in Figure 3 and the lever 65 is swung in a counterclockwise direction the valve will be opened and the lever 66 swung downwardly until the pin 73 engages the nose of the latch and momentarily cams the latch to the left after which the nose will engage the pin 73 and maintain the valve in open position against the tension of the spring 67. When the solenoid is energized the plunger 75 and the link 76 will be raised and the pin 77 will lift the tail end 78 of the latch, thereby swinging the latch in a counterclockwise direction and disengaging the nose 72 from the pin 73 whereby the spring 67 will return the lever 66 to its upper position and close the valve. In order that the valve be closed as soon as the correct amount of material has been discharged from the pipe 12 into the receptacle 15 I provide means for yieldably suspending the receptacle and operative upon the placing of the required amount of material therein for closing a circuit to energize the solenoid. The receptacle 15 is suspended from a lower scale arm 79 by means of a bale 80 pivotally connected to the arm as at 81. The arm 79 is suspended at one end by means of a link 82 connected to a fixed bracket 83 and at its other end the arm 79 is connected to a main scale beam 84 by means of links 85. The main scale beam 84 is fulcrumed as at 86 on a fixed bracket 87 and is provided with the usual slidable scale weights 88 and 89. A switch 90 which is preferably of the same type as the switch 52 is mounted on the scale beam 84 and is adapted when the beam is down to break the associated circuit and when the beam is raised to close the circuit. This switch is connected in series with the solenoid 74 and the power line 54 by means of conductors 91.

When the required amount of material has been discharged from the pipe 12 into the container 15 the latter will be lowered and will raise the scale arm 84 thus closing the switch 90 and energizing the solenoid 74 whereupon the plunger 75 and the link 76 will be raised, thus moving the latch 70 and releasing the pin 73 after which the spring 67 will return the valve to its closed position and prevent further flow of material into the receptacle.

It is apparent that by using an apparatus embodying my invention, as herein described, it is possible to very accurately control the operation of a plant used for preparing paving mixtures. A single unskilled operator can operate the mechanism for supplying several different solid materials and a semi-liquid material to a mixer in very accurate relative proportions so that there is no danger of poor mixtures being made through carelessness of the operator. The apparatus is simple in construction and so arranged as to permit the use of relatively rugged parts which are necessary in apparatus which is used in connection with this kind of work.

I claim as my invention:

1. In an apparatus for weighing the ingredients of paving material, the combination with a supply means having a discharge opening, of a closure for said opening and movable to open and closed positions, a receptacle disposed in cooperative relation with said discharge opening, a yieldable support for said receptacle, closure actuating means connected to said closure for moving the latter to open position, means normally maintaining the closure in closed position, a latch engageable with said closure actuating means for maintaining the closure in open position, a solenoid having a movable element adapted to move said latch when the solenoid is energized to thereby disengage the latch from the closure actuating means, a weighing scale having a tiltable beam adapted to be tilted from lower to upper positions, connections between said beam and said yieldable support whereby said beam will be tilted to its upper position when a predetermined weight of material has been transferred from the supply means to said receptacle, a Mercoid switch mounted on said beam, said switch being adapted to be open when the beam is in its lower position and to be closed when the beam is in its upper position, and means forming an electric circuit with the switch and said solenoid.

2. In an apparatus for weighing the ingredients of paving material, the combination with a plurality of individual supply means each having a discharge opening, of a closure for each of said openings, said closures being movable to open and closed positions, a receptacle disposed in cooperative relation with the openings in said supply means, a yieldable support for said receptacle, individual closure actuating means independently associated with the respective closures for moving the latter to open and closed positions, spring means connected to said closure actuating means for urging the closures to closed positions, a plurality of latches independently engageable with the respective closure actuating means for maintaining said closures in open position, a plurality of solenoids each having a movable element, said movable elements being adapted to release the respective latches from the actuating means when said solenoids are energized, a normally open electric switch associated with said yieldable support and adapted to be closed when a predetermined quantity of material has been transferred from one of said supply means to said receptacle, and means forming a common electric circuit with said solenoids and with said switch whereby said solenoids are adapted to be energized simultaneously.

3. In an apparatus for weighing the ingredients of paving material, the combination with a plurality of individual supply means each having a discharge opening, of a closure for each of said openings, said closures being movable to open and closed positions, a receptacle disposed in cooperative relation with the openings in said supply means, a yieldable support for said receptacle, individual closure actuating means independently associated with the respective closures for moving the latter to open and closed positions, spring means connected to said closure actuating means for urging the closures to closed positions, a plurality of latches independently engageable with the respective closure actuating means for maintaining said closures in open position, a plurality of solenoids each having a movable element, said movable elements being adapted to release the respective latches from the actuating means when said solenoids are energized, a weighing scale having a weighted main scale beam adapted to be tilted from lower to upper positions, connections between said beam and said yieldable support whereby said beam will be tilted to its upper position when a predetermined weight of material has been transferred from one of said supply means to said receptacle, an electric switch associated with said beam and adapted to be opened when the beam is in its lower position and to be closed when the beam is in its upper position, means forming an electric circuit with said switch and said solenoids for energizing said solenoids simultaneously when the switch is closed, a supplemental scale beam normally disconnected from said main beam, and means for connecting said supplemental beam to said main beam after said switch has been first closed for additionally weighting and lowering the latter whereby said switch will be opened, both of said beams being adapted to be raised to their upper positions when a predetermined additional weight of material has been transferred from another of said supply means to again close said switch to close the closure of said other supply means.

4. In apparatus for weighing the ingredients of paving material, the combination with a hopper having a discharge opening, of a gate for said opening and movable to open and closed position, a receptacle yieldably supported in cooperative relation with said opening, a manually operable pivoted hand lever, a connection between said hand lever and said gate, a spring connected to said hand lever for normally maintaining said gate in closed position, a latch adapted to engage said hand lever for maintaining the gate in open position, and latch releasing means associated with said receptacle and with said latch and operable when a predetermined weight of material has been transferred from said hopper to said receptacle for releasing said latch to thereby permit said spring to return the gate to its closed position.

5. In an apparatus for weighing the ingredients of paving material, the combination with a hopper having a discharge opening, of a gate for said opening and movable to open and closed positions, a receptacle disposed in cooperative relation with said discharge opening, a yieldable support for said container, a manually operable pivoted hand lever, a connection between said hand lever and said gate, a spring connected to said hand lever for normally maintaining said gate in closed position, a projection on said hand lever, a pivoted latch having a nose adapted to engage the projection on said hand lever for maintaining the gate in open position, a solenoid having a winding and a movable plunger, a link connecting said plunger to the tail of said latch, a weighing scale having a scale beam, connections between said scale beam and said yieldable support, a normally open electric switch on said scale beam, and means forming an electric circuit with said switch and with said solenoid winding, said switch being adapted to be closed when a predetermined weight of material has been transferred from said hopper to said receptacle and said scale beam is thereby raised to energize said solenoid and release said latch, whereby said spring will return the gate to its closed position.

6. In an apparatus for weighing the ingredients of paving material, the combination with a plurality of hoppers each having a discharge opening, of a gate for each of said openings, said gates being movable to open and closed positions, a receptacle disposed in cooperative relation with the openings in said hoppers, a yieldable support for said receptacle, a plurality of manually operable pivoted hand levers, a plurality of links connecting the respective hand levers to the individual gates for moving the latter to open and closed positions, a plurality of springs individually connected to said hand levers for urging the gates to closed positions, a plurality of pivoted latches independently engageable with the respective hand levers for maintaining said closures in open position, a plurality of solenoids each having a movable element, a plurality of links respectively connecting said movable elements to said latches, said movable elements being thereby adapted to release the respective latches from the hand levers when said solenoids are energized, a normally open electric switch associated with said yieldable support and adapted to be closed when a predetermined quantity of material has been transferred from one of said hoppers to said receptacle, and means forming a common electric circuit with said solenoids and with said switch whereby said solenoids are adapted to be energized simultaneously.

7. In an apparatus for weighing the ingredients of paving material, the combination with a plurality of individual hoppers each having a discharge opening, of a gate for each of said openings, and movable to open and closed positions, a receptacle disposed in cooperative relation with the openings in said hoppers, a yieldable support for said receptacle, a plurality of manually operable pivoted hand levers, a plurality of links connecting the respective hand levers to the individual gates for independently moving the latter to open and closed positions, a plurality of springs individually connected to the respective gates for urging the gates to closed positions, a plurality of pivoted latches independently engageable with the respective hand levers for maintaining said gates in open position, a plurality of solenoids each having a movable element, a plurality of links respectively connecting said movable elements to said latches for releasing the latter from the hand levers when said solenoids are energized, a weighing scale having a weighted main scale beam adapted to be tilted from lower to upper positions, connections between said beam and said yieldable support whereby said beam will be tilted to its upper position when a predetermined weight of material has been transferred from one of said hoppers to said receptacle, an electric switch associated with said beam and adapted to be opened when the beam is in its lower position and to be closed when the beam is in its upper position, means forming an electric circuit with said switch and said solenoids for energizing said solenoids simultaneously when the switch is closed, a supplemental scale beam normally disconnected from said main beam, and means for connecting said supplemental beam to said main beam after said switch has been first closed for additionally weighting and lowering the latter whereby said switch will be opened, both of said beams being then adapted to be raised to their upper positions when a predetermined additional weight of material has been transferred from another of said hoppers to again close said switch to close the gate of said other receptacle.

8. In an apparatus for weighing the ingredients of paving material, the combination with a plurality of hoppers each having a discharge opening, of a gate for each of said openings and movable to open and closed positions, a receptacle disposed in cooperative relation with the openings in said hoppers, a yieldable support for said receptacle, gate actuating means connected to the respective gates, a weighing scale having a main scale beam adapted to be tilted from lower to upper positions, connections between said beam and said yieldable support whereby said beam will be tilted to its upper position when a predetermined weight of material has been transferred from one of said hoppers to said receptacle, a connection between said scale beam and gate actuating means for actuating the latter when the beam is raised to thereby close the gate associated with said hopper, a supplemental scale beam normally disconnected from said main beam, and means for connecting said supplemental beam to said main beam after said gate has been closed for additionally weighting and lowering the main scale beam, both of said beams being then adapted to be raised when a predetermined additional weight of material has been transferred from another of said hoppers to close the gate of said other hopper.

9. In an apparatus for weighing the ingredients of paving material, the combination with a supply pipe having a discharge opening, of a valve therein movable to open and closed positions, a receptacle disposed in cooperative relation with said discharge opening, a yieldable support for said receptacle, a lever connected to said valve for moving the latter to open and closed positions, a spring connected to said lever for normally maintaining the valve in closed position, a fixed bracket, a stop pin thereon engageable with said lever for arresting the movement of the latter when the valve has been moved to its closed position by said spring, a latch pivotally mounted on said bracket and having a nose engageable with said lever for maintaining the valve in open position, a solenoid having a movable element, a link connecting said element to the tail of said latch for moving the latch when the solenoid is energized to thereby disengage said latch nose from the valve lever, a weighing scale having a movable element, connections between said element and said yieldable support whereby said movable element will be moved in one direction when a predetermined weight of material has been transferred from said supply pipe to said receptacle, a normally open electric switch associated with said movable scale element and adapted to be closed when said scale element is moved in said direction, and means forming an electric circuit with said solenoid and said switch.

10. In an apparatus for weighing the ingredients of paving material, the combination with a supply pipe having a discharge opening, of a valve therein movable to open and closed positions, a receptacle disposed in cooperative relation with said discharge opening, a yieldable support for said receptacle, a valve lever connected to said valve and disposed to the rear of said supply pipe, a spring connected to said valve lever for normally maintaining the valve in closed position, a fixed bracket disposed to the rear of said supply pipe, a stop pin on said bracket engageable with said valve lever for arresting the movement of the latter when the valve has been moved to its closed position by said spring, a latch pivotally mounted on said bracket and having a nose engageable with said valve lever for maintaining the valve in open position, a manually operable lever connected to said valve for moving the latter to open position and disposed in front of said supply pipe, a solenoid having a movable element, a link connecting said element to the tail of said latch for moving the latch when the solenoid is energized to thereby disengage said latch nose from the valve lever, a weighing scale having a movable element, connections between said element and said yieldable support whereby said movable element will be moved in one direction when a predetermined weight of material has been transferred from said supply pipe to said receptacle, a normally open electric switch associated with said movable scale element and adapted to be closed when said scale element is moved in said direction, and means forming an electric circuit with said solenoid and said switch.

In testimony whereof, I have hereunto subscribed my name.

JOHN W. DAVITT.